Jan. 2, 1962  R. C. SCHMITT  3,015,465
SUPPORT CLAMP
Filed May 11, 1959
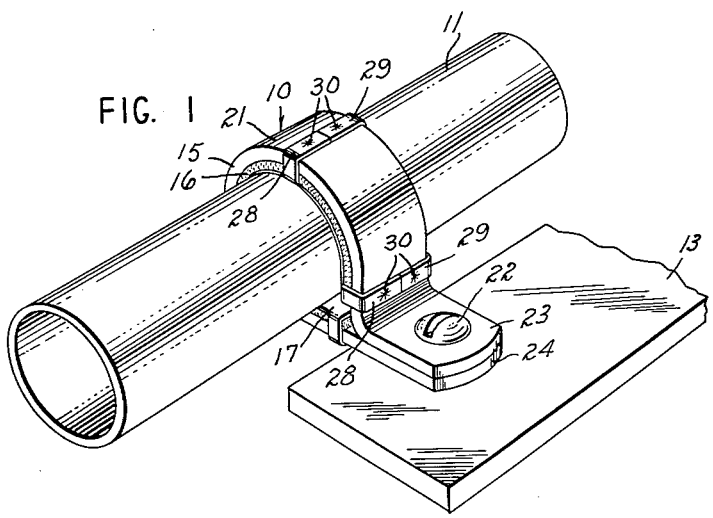
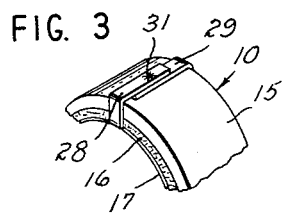
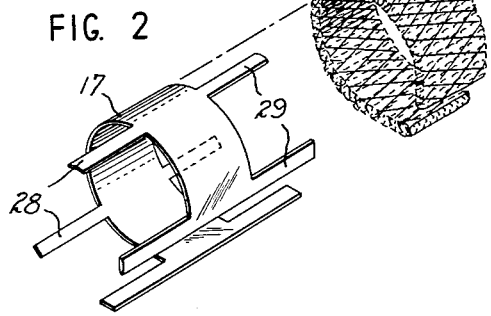
INVENTOR.
RAYMOND C. SCHMITT
BY
Lindsey and Prutzman
ATTORNEYS

United States Patent Office 3,015,465
Patented Jan. 2, 1962

3,015,465
SUPPORT CLAMP
Raymond C. Schmitt, Meriden, Conn., assignor to Aero Gasket Corporation, Meriden, Conn., a corporation of Connecticut
Filed May 11, 1959, Ser. No. 812,344
3 Claims. (Cl. 248—74)

This invention relates to a support for tubing, pipe and the like and more specifically relates to improvements in metal strap-type support clamps.

It is an object of this invention to provide an improved support clamp for a conduit such as tubing and the like which clamps the tubing in a manner that withstands substantial vibration and temperature changes without causing damage to the clamp or the tubing and without substantially weakening the strength of the support.

It is a further object of this invention to provide an improved support clamp that materially reduces the frictional wear between the clamp and the tubing occasioned by relative movement of the tubing and clamp during expansion and contraction from temperature changes as well as movement caused by vibration.

It is a further object of this invention to provide an improved support clamp that is economical to manufacture, durable in operation and that firmly yet flexibly supports tubing and the like relative to a supporting structure.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is a perspective view of a preferred embodiment of the improved clamp of this invention supporting a section of tubing;

FIG. 2 is an exploded perspective view of the support clamp of FIG. 1; and

FIG. 3 is a partial perspective view of a second embodiment of my invention.

As seen in FIGS. 1 and 2, the support clamp, designated generally as 10, is arranged to encircle a section of tubing or pipe 11 and has its ends fastened to the supporting structure 13. Support clamp 10 generally comprises a metal strap 15, a wire mesh or wool pad 16 and a bearing strip 17 arranged so that the bearing strip 17 is in contact with and substantially surrounds the outer periphery of tubing 11. Pad 16 spaces bearing strip 17 from inside surface 20 of substantially circular loop 21 formed intermediate the ends of strap 15.

Metal strap 15 is constructed so that the ends 23 and 24 can be secured to an appropriate supporting surface, such as by passing fastener 22 through apertures 25 and 26. Although the embodiment of FIG. 1 shows the ends 23 and 24 as extending in substantially the same direction away from the loop 21 with end 23 overlying end 24, it is noted that ends 23 and 24 can be relatively arranged in other configurations.

Wire mesh pad 16 is formed of a material which exhibits the desired resiliency, heat resistance, etc. and is shaped in conformity with the dimensions of inside face 20 of loop 21 and has substantially the same width and length as the loop 21. As seen in FIG. 2, pad 16 is provided with external wire wrapping 18 which imparts dimensional stability to the pad.

Bearing strip 17 is the sole support holding pad 16 in position within the loop 21 and acts as a friction-reducing bearing surface between the pad and the tubing. In certain applications of my improved clamp, the strip 17 is provided with a layer or coating of a soft metal, such as silver, to facilitate limited movement of the tubing relative to the support clamp. Strip 17 is provided with a plurality of outwardly extending tabs 28 and 29 which are bent upwardly and around the metal strap 15 to secure the bearing strip and pad in position on loop 21. In the embodiment shown in FIG. 1, tabs 28 and 29 are dimensioned so that their ends are in abutting engagement and each tab is welded at point 30 to the outer surface of loop 21.

In the alternative embodiment of FIG. 3, it is seen that the straps 28 and 29 are sufficiently long to overlie each other so that a single spot weld 31 welds the tabs together. By only welding the tab ends together, strip 17 (as well as pad 16) can slide relative to strap 15 to accommodate irregularities in the tubing and to accommodate heat expansion, etc. in the support clamp 10 as well as the tubing. Of course, the tabs can also be welded at 31 to the strap 15 as in the embodiment of FIG. 1.

As is apparent from the foregoing details of construction of my improved support clamp, the clamp 10 can be attached to the tubing 11 either by slipping the clamp over the end of the tubing or by opening the clamp to permit insertion of the pipe between ends 23 and 24 into loop 21. When the fastener draws the ends 23 and 24 together to hold them to the support 13 (see FIG. 1), the loop is closed down upon the tubing to bring the bearing strip 17 into contact with the outer periphery of the tubing and to slightly compress the steel mesh pad between bearing strip 17 and the inside surface 20 of the loop 21. Thus the tubing 11 is firmly but flexibly held by my improved support clamp in such a way that heat expansion and vibration are effectively accommodated without causing the failure of either the tubing or the clamp. Further, the strip 17 substantially overcomes the frictional wear upon the tubing and clamp because of vibration or expansion and contraction of the tubing by presenting a smooth surface. This feature is of particular importance when my clamp is utilized with flexible tubing having a braided or woven wire external covering. It is also apparent that my improved support clamp can be mass produced with high standards of dimensional uniformity not heretofore obtainable with clamps of this type.

As will be apparent to persons skilled in the art, various modifications and adaptations of the structure above described will become readily apparent without departure from the spirit and scope of the invention, the scope of which is defined in the appended claims.

I claim:

1. A support clamp for tubing and the like comprising a metal strap having a loop formed intermediate the strap ends, one of said strap ends overlying the other strap end and spaced therefrom, said loop being dimensioned to substantially surround the tubing in spaced relationship therewith, means on said strap ends for securing said strap to a support body, a wire mesh pad dimensioned to overlie the inside surface of said circular loop, and a metal bearing strip disposed along the inside surface of said pad extending substantially throughout the full length and width thereof and engageable with the tubing, said strip having a plurality of integrally formed tabs fastened to the outside of said loop and forming the sole support for said pad and said strip relative to said loop.

2. A support clamp for tubing and the like comprising a metal strap having a substantially circular loop formed intermediate the strap ends and having apertures formed in the ends of said strap for accepting a fastener to secure the strap to a support body, said loop being dimensioned to substantially surround the tubing in spaced relationship therewith, a wire wool pad having substantially the same shape as the inside of said loop and means securing said wire wool pad in position along the inside surface of said loop, said means including a metal bearing strip disposed along the inside surface of said pad and having a plurality of tabs wrapped around said loop and fastened together on the outside of said loop, said tabs forming the sole support for said pad and said bearing strip relative to said loop.

3. The support clamp of claim 2 wherein the portion of the bearing strip that contacts the tubing is provided with a soft metal coating.

References Cited in the file of this patent

UNITED STATES PATENTS

| | | |
|---|---|---|
| 2,215,283 | Adler | Sept. 17, 1940 |
| 2,427,883 | Score | Sept. 23, 1947 |
| 2,790,614 | Miller | Apr. 30, 1957 |

FOREIGN PATENTS

| | | |
|---|---|---|
| 447,533 | Canada | Mar. 30, 1948 |
| 794,571 | Great Britain | May 7, 1958 |